United States Patent [19]
Laczko, Sr. et al.

[11] Patent Number: 5,845,239
[45] Date of Patent: Dec. 1, 1998

[54] MODULAR AUDIO DATA PROCESSING ARCHITECTURE

[75] Inventors: Frank L. Laczko, Sr., Allen; Karen L. Walker, Richardson, both of Tex.

[73] Assignee: Texas Instruments Incorporated, Dallas, Tex.

[21] Appl. No.: 964,092

[22] Filed: Nov. 4, 1997

Related U.S. Application Data

[63] Continuation of Ser. No. 100,591, Jul. 30, 1993, abandoned.

[51] Int. Cl.⁶ .............................. G10L 9/00; G06F 11/10
[52] U.S. Cl. .......................... 704/200; 371/47.1; 371/54
[58] Field of Search .................... 704/200; 371/47.1, 371/54

[56] References Cited

U.S. PATENT DOCUMENTS

| | | | |
|---|---|---|---|
| Re. 34,850 | 2/1995 | Murakami et al. | 395/800 |
| 4,096,566 | 6/1978 | Borie et al. | 395/306 |
| 4,316,285 | 2/1982 | Bobilin et al. | 370/105 |
| 4,841,574 | 6/1989 | Pham et al. | 395/2.1 |
| 5,028,995 | 7/1991 | Izawa et al. | 348/402 |
| 5,132,988 | 7/1992 | Fisher et al. | 375/14 |
| 5,170,490 | 12/1992 | Cannon et al. | 395/2.1 |
| 5,218,710 | 6/1993 | Yamaki et al. | 395/2.1 |
| 5,297,231 | 3/1994 | Miller | 395/2.1 |
| 5,329,283 | 7/1994 | Smith | 342/25 |
| 5,394,394 | 2/1995 | Crowther et al. | 370/60 |
| 5,425,061 | 6/1995 | Laczko et al. | 375/371 |

FOREIGN PATENT DOCUMENTS

| | | |
|---|---|---|
| 0 448 074 A2 | 9/1991 | European Pat. Off. ......... H04L 7/04 |
| 33 07 444 A1 | 9/1984 | Germany . |
| A-301496 | 2/1993 | Germany . |

*Primary Examiner*—David R. Hudspeth
*Assistant Examiner*—Susan Wieland
*Attorney, Agent, or Firm*—Gerald E. Laws; James C. Kesterson; Richard L. Donaldson

[57] ABSTRACT

An audio data processing system having a control processor coupled to an execution controller through a bus is provided. The control processor serves as a master processor to control the operation of the execution controller which in turn controls the execution of a multiplier accumulator. An ancillary data handler is provided to retrieve ancillary data from an input first in/first out (FIFO) buffer. Audio data is retrieved from the input buffer by the control processor and processed data is output through an output block.

11 Claims, 5 Drawing Sheets

MODULAR AUDIO DATA PROCESSING ARCHITECTURE

This application is a Continuation, of application Ser. No. 08/100,591, filed Jul. 30, 1993, abandoned.

TECHNICAL FIELD OF THE INVENTION

This invention relates in general to the field of electronic systems and more particularly to an improved modular audio data processing architecture and method of operation.

BACKGROUND OF THE INVENTION

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG Standard is useful in a variety of products including digital compact cassette decoders and encoders, minidisc decoders and encoders, and other decoders and encoders using the MPEG Standard. In addition, other audio standards, such as the Dolby standard, involve the encoding and decoding of audio and video data transmitted in digital format.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications. Audio and video data compression for digital transmission of information will soon be used in large scale transmission systems for television and radio broadcasts as well as for encoding and playback of audio and video from such media as digital compact cassette and minidisc.

SUMMARY OF THE INVENTION

Accordingly, a need has arisen to implement a system that can perform audio data decompression and compression operations at a lower cost than the cost associated with a system centered around a programmable digital signal processor allowing for a degree of modularity to allow the system to adapt to different compression and decompression applications.

In accordance with the teachings of the present invention, an integrated audio data processing system is described which substantially reduces or eliminates disadvantages associated with prior systems and methods for performing the audio data compression and decompression operations.

According to one embodiment of the present invention, a data processing system is provided that comprises a control processor coupled to an execution control unit. The execution control unit is further coupled to a multiplier accumulator. The control processor functions to input a data stream and to output either an encoded or a decoded data stream, depending upon the particular operation required of the system.

According to an alternate embodiment of the present invention, a data processing system is provided that comprises a control processor operable to receive a data stream through an input buffer. An ancillary data handler is coupled to the input buffer and operable to retrieve ancillary data from the input data stream and output the ancillary data. The control processor is operable to cause the execution control unit to perform dequantization, transformation, and filtering of compressed audio data within the input stream. The dequantized, transformed and filtered data is then output by the control processor.

BRIEF DESCRIPTION OF THE DRAWINGS

A more complete understanding of the technical advantages of the present invention may be acquired by referring to the attached FIGUREs wherein like reference numbers indicate like features and WHEREIN.

DETAILED DESCRIPTION OF THE INVENTION

Introduction

The present invention comprises a modular architecture for an audio data processing system that may be used to efficiently encode or decode serial data streams in order to implement the data compression and decompression operations using a variety of syntax including the MPEG standard syntax. In order to accomplish real-time processing of serial data streams, the system of the present invention must be able to receive and process a bit stream at variable bit rates at up to 15 megabits per second. In addition, the bit stream may contain a plurality of multiplexed data sets. These data sets may comprise audio data, video data, and ancillary data. The system of the present invention must be able to retrieve the particular data set to be processed and retrieve and output any ancillary data within the data stream without disrupting the processing of the other data sets while maintaining the integrity of the ancillary data.

In processing an audio data stream, the system of the present invention may utilize the systems and methods for audio data decoding described in U.S. patent application Ser. No. 08/021,007 entitled "Integrated Audio Decoder System and Method of Operation"; U.S. patent application Ser. No. 08/054,127 entitled "Audio Decoder Circuit and Method"; U.S. patent application Ser. No. 08/054,768 entitled "Hardware Filter Circuit"; and U.S. patent application Ser. No. 08/054,126 entitled "System Decoder Circuit and Method of Operation", (hereinafter referred to as "the Audio Decoder Patents"), assigned to the assignee of the present application, the disclosures of which are hereby incorporated by reference into the present application as if set forth fully herein.

General Architecture

Figure 1:
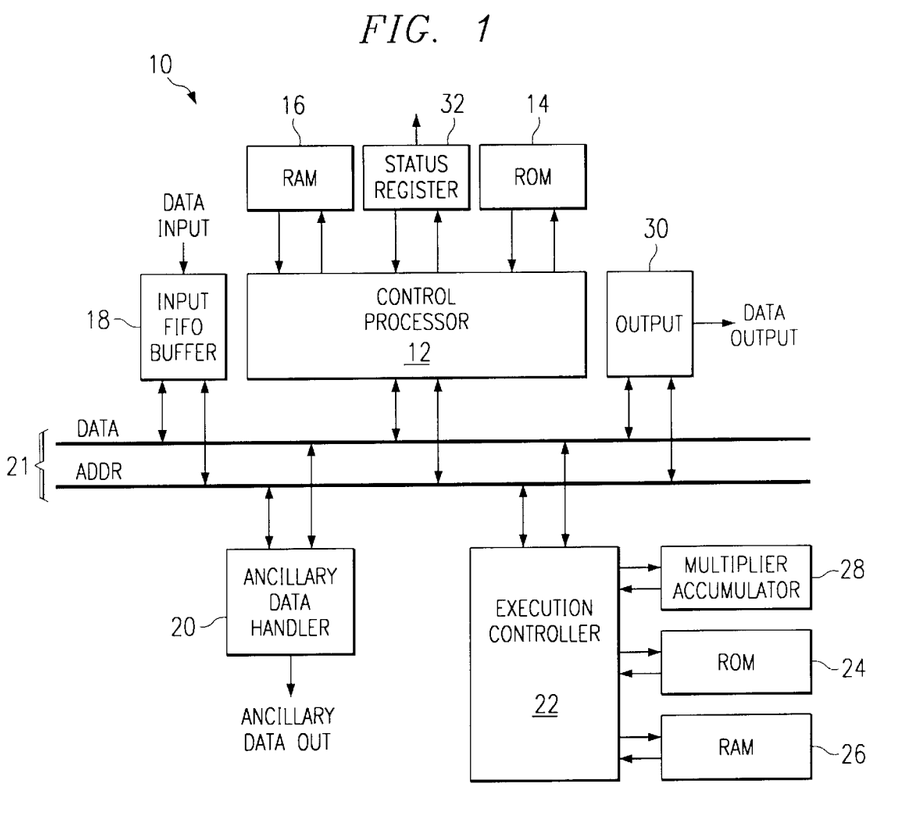
FIG. 1 is a schematic block diagram of an audio data processing system constructed according to the teachings of the present invention.

Referring to FIG. 1, an audio data processing system 10 is shown to comprise a control processor 12. The architecture of control processor 12 may comprise the construction of the systems described with reference to FIG. 3 of the Audio Decoder Patents previously incorporated herein by reference or other suitable programmable arithmetic logic units. Generally, control processor 12 functions as the master processor of system 10 to control the operation of the processing of data received by system 10. Control processor 12 utilizes microcoded routines stored in a microcode read only memory 14. Control processor 12 is also coupled to a random access memory 16, which is used to control processor 12 as a scratchpad to store intermediate values during the processing of audio data. System 10 receives a serial data stream into an input FIFO buffer 18. Input FIFO buffer 18 is accessed by control processor 12 and an ancillary data handler 20 through an address and data bus 21. Control processor 12 accesses the data stored in buffer 18 in a first in/first out manner and passes the data as necessary to an execution controller 22 through bus 21.

Execution controller 22 comprises a microcode-controlled state machine that executes routines stored in a microcode read only memory 24. Execution controller 22 uses a random access memory 26 to store the values received from control processor 12 through bus 21 and to store intermediate results of data processing activities during the encoding and decoding of audio data.

The execution controller 22 is bidirectionally coupled to a multiplier accumulator 28. Multiplier accumulator 28 may be advantageously constructed using the architecture disclosed in FIGS. 4 and 6 of the Audio Decoder Patents, previously incorporated into the present disclosure by reference. Multiplier accumulator 28 functions to perform fast Fourier transforms, direct cosine transforms, multiplication operations, division operations, and combined multiplication and accumulate operations. In addition, operations such as addition, subtraction, negations and shift operations can be performed by multiplier accumulator 28. Functioning under the control of control processor 12, the system 10 functions to process data using the execution controller and the multiplier accumulator 28 and to output the process data through an output block 30 which is also coupled to and accessed through bus 21. In addition, control processor 12 supplies status information to other systems coupled to audio data processing system 10 through a status register 32. Status register 32 may communicate the value stored for the header of the current frame of audio data and the status of the synchronization of system 10 with the input data stream.

As discussed previously, the input data stream can contain audio and video data as well as ancillary data which may be used by systems coupled to audio data processing system 10 to communicate various information or to control systems associated with the audio data processing system 10. As such, the ancillary data contained in the input data stream is critical and must be carefully handled by data processing system 10. An important technical advantage of the present invention inheres in the fact that the system 10 is able to set a tap point into input buffer 18 and to simultaneously retrieve ancillary data from input buffer 18 while other data is being processed in the control processor 12, execution controller 22, and multiplier accumulator 28. The ancillary data handler 20 receives the location of the beginning of the ancillary data located within input buffer 18 from the control processor 12 and retrieves the ancillary data from input buffer 18 through bus 21. In this manner, large amounts of ancillary data within the input data stream can be removed from the input buffer 18 and output to systems external to system 10 such that the input buffer 18 can be filled with new data from the input data stream. The location of the beginning of the ancillary data within a particular frame of audio data may be calculated from the information within the header. The methods used to perform this calculation will be discussed more fully with reference to FIG. 5 herein.

System Operation

FIGS. 2a, 2b, 3, 4 and 5 are flow chart representations of certain operations of the audio data processing system 10. In addition, specific reference is made to FIGS. 11–31 of the Audio Decoder Patents previously incorporated by reference herein for further operations which may be performed by audio data processing system 10.

Audio Decoding Operation

Figure 2A:
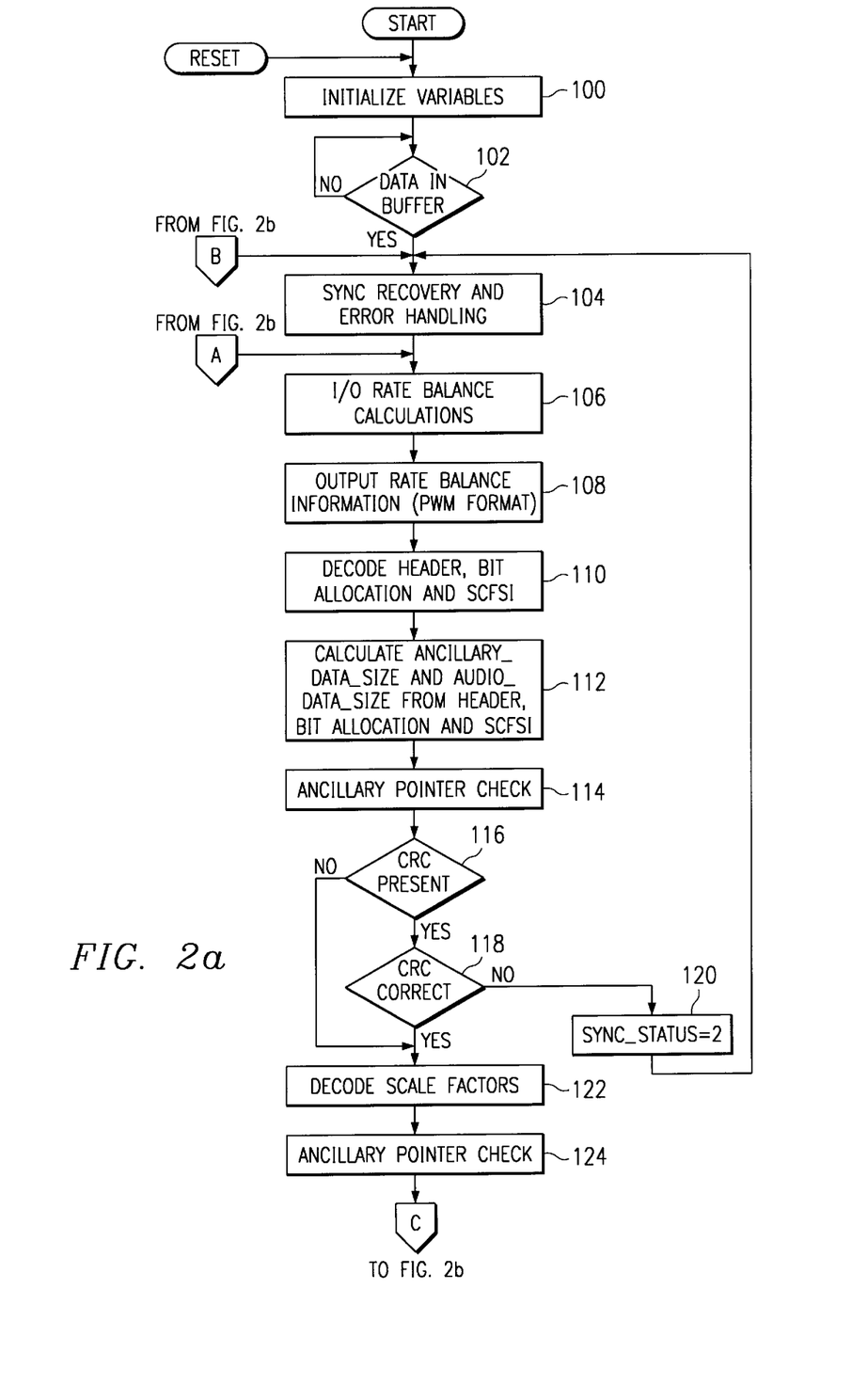
FIGS 2a, 2b, 3, 4 and 5 are flow charts illustrating the operation of the audio data processing system of the present invention.
Figure 2B:
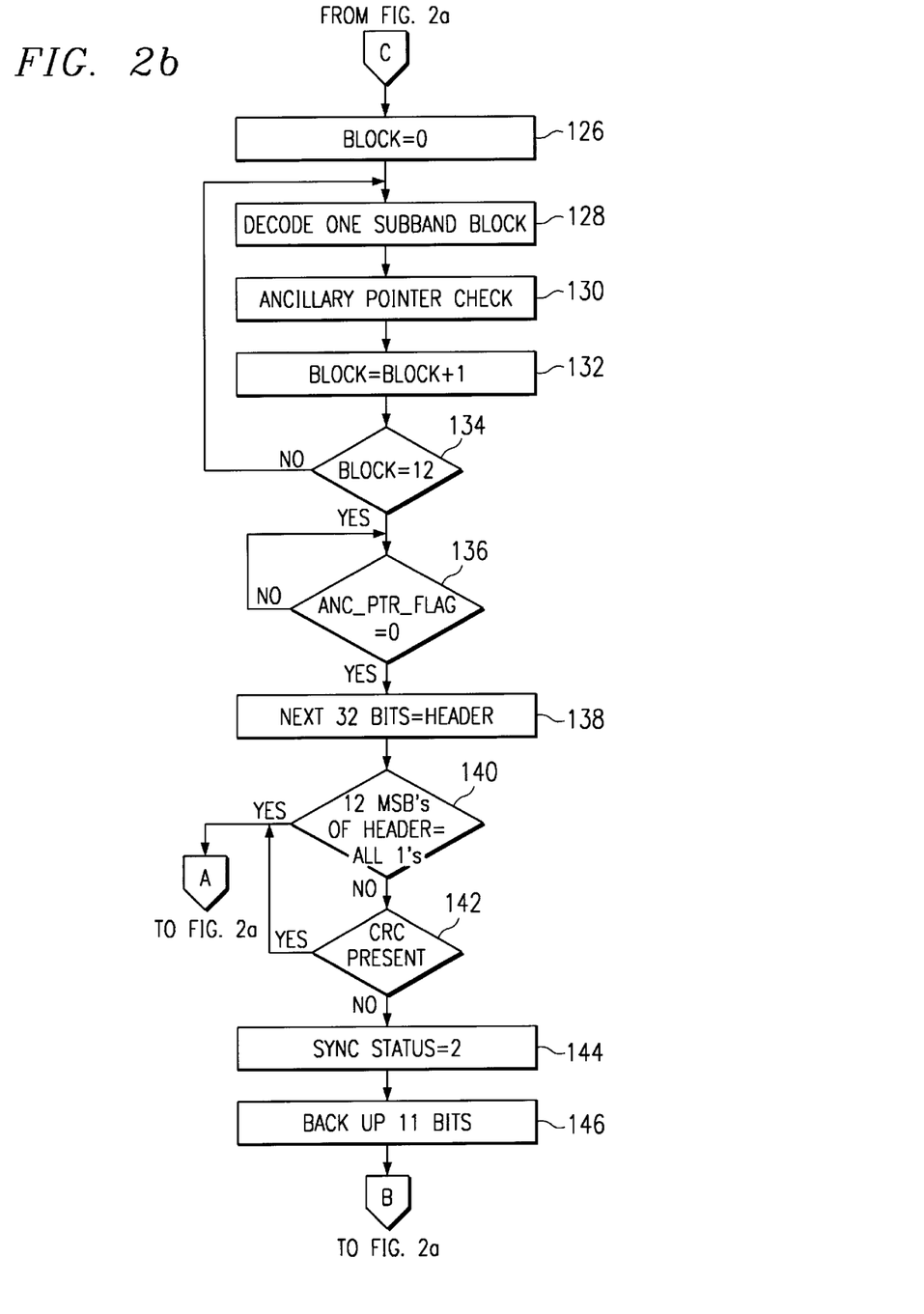

FIGS. 2a and 2b are a flow chart representation of the audio decoding operation which may be performed by audio data processing system 10. The method of the present invention begins at step 100 where all the variables used in the operation of the present invention are initialized. The method then proceeds to step 102 where the input FIFO buffer 18 is checked for data. If no data is present in input FIFO buffer 18, the method continues to check the buffer 18 until data is present. When data is present, the method proceeds to step 104 where the method branches to a subroutine to recover synchronization with the data stream. The synchronization recovery operation will be discussed more fully with reference to FIG. 3 herein. Once synchronization is recovered in step 104, the method proceeds to step 106 where the input/output rate balance calculations are performed. The input/output rate balance calculations serve to insure that input FIFO buffer 18 will not overflow or underflow. The system 10 calculates a running average of the amount of unprocessed data in buffer 18 compared to the amount of empty space or processed data in buffer 18. The system 10 then outputs a signal indicative of this average to allow for systems associated with system 10 to adjust the rate of the input data stream to prevent overflow or underflow of buffer 18. The operations associated with the input/output rate balance calculations will be discussed more fully with reference to FIG. 4 herein. Once the calculations are performed in step 106, the method proceeds to step 108 where the rate balance information is output in, for example, pulse width modulated format. Suitable methods and systems for performing this rate balance calculation are described in U.S. patent application Ser. No. 08/071,744 entitled "Method and Apparatus for Bit Stream Synchronization" assigned to the assignee of the present application, the disclosure of which is hereby incorporated by reference as if fully set forth herein (hereinafter referred to as "the Rate Balance Patent").

The method proceeds to step 110 where the control processor 12 retrieves from the data stream stored in the input buffer 18 the header information bit allocation information, and scale factor select information. These portions of the data stream are decoded by the control processor 12 in step 110. The content and format of these portions of information are fully described in the Audio Decoder Patents. The decoded header is placed in status register 32 by control processor 12. The method proceeds to step 112 where two values are calculated using the information gleaned from the header bit allocation and scale factor select information. The first value calculated is the ancillary data size variable which is a value indicative of the amount of ancillary data contained within the frame associated with the header decoded in step 110. The second value is the audio data size value which similarly is indicative of the amount of audio data contained within the frame associated with the header decoded in step 110. These values are calculated using the information contained in the header as well as the bit allocation and scale factor select information. The method then proceeds to step 114 where the ancillary data size value and the audio data size value are used to perform an ancillary pointer check. The method used to perform the ancillary pointer check will be described more fully with reference to FIG. 5 herein. In general, the ancillary data size and audio data size values are used to determine when the dividing point between audio data and ancillary data resides in input buffer 18. This is due to the fact that the frame size can be larger than the size of input buffer 18. As such, the ancillary data handler 20 must be engaged when the first of the ancillary data within a particular frame is present in the input buffer 18.

The method proceeds from step 114 to step 116 where a determination is made as to whether or not a CRC word is present. This information is contained within the header. If a CRC is present, the method proceeds to step 118 where a determination is made whether or not the CRC calculation is valid in that the portion of the data stream protected by the CRC word contains no bit errors. If the CRC calculation is not valid, the method proceeds to step 120 where a synchronization status variable stored in status register 32 is set equal to "2" to indicate to the remainder of system 10 and to systems associated with system 10 that synchronization with the input data stream has been lost. The method proceeds from step 120 to step 104 to attempt to recover synchronization and to perform error concealment routines until synchronization can be retrieved.

If the CRC calculation is valid in step 118, the method proceeds to step 122 where the scale factor information is retrieved from the data stream and decoded. The methods used to perform this operation are fully described in the Audio Decoder Patents incorporated herein by reference previously.

The method proceeds from step 122 to step 124 where an ancillary pointer check is once again performed. The method used to perform the ancillary pointer check will be described fully with reference to FIG. 5 herein. The method proceeds from step 124 and continues on FIG. 3b to step 126 where a block variable is set equal to "0". According to the MPEG syntax, there are 12 blocks per frame of compressed audio data. In order to prevent the loss of ancillary data, the method of the present invention performs an ancillary pointer check after each block of data is decoded. Accordingly, the method proceeds from step 126 to step 128 where a single block of compressed audio data is decoded. The methods used to decode the subbands of the compressed audio data are fully described in the Audio Decoder Patents incorporated by reference previously. The method then proceeds from step 128 to step 130 where an ancillary pointer check is once again performed.

The method then proceeds to step 132 where the block variable is incremented. The method then proceeds to step 134 where the block variable is compared to the number "12". If the block variable has not yet reached the number "12", the method returns to step 128 where the next subband block is decoded. If the block variable is equal to "12" in step 134, the entire frame has been decoded and the method proceeds to step 136 where an ancillary pointer flag (ANC_PTR_FLG) is tested. The ancillary pointer flag will be set equal to "1" as long as the ancillary data handler is operating on ancillary data within input buffer 18. As such, the control processor 12 will continue to test the ancillary pointer flag until the ancillary data handler sets it equal to "0" in step 136. Once the ancillary data handler 20 is finished outputting ancillary data, the ancillary pointer flag will be equal to "0" and the method will proceed from step 136 to step 138 where the next thirty-two bits in the input data stream will be read in as the header of the next frame of audio data.

The method then proceeds to step 140 where the first twelve bits of the new header are tested to see if they comprise a synchronization word. According to the MPEG syntax, twelve ones are used as the synchronization word. If the first twelve bits are all ones, the method returns to step 106 shown in FIG. 2a where the input/output rate balance calculations are performed. If the first twelve bits of the header are not all ones, the method proceeds to step 142 where a determination is made as to whether or not a CRC word is present. If at step 142, a CRC is determined to be present, the method returns to step 106 and proceeds through the method described previously until step 118 where the CRC will be checked for validity. If, at step 142, there is no CRC present, the method proceeds to step 144 where the synchronization status variable in status register 32 is set equal to "2" to indicate a loss of synchronization. The method then proceeds to step 146 where the control processor 12 will back up eleven bits in the bit stream. The method will then return to step 104 where synchronization recovery operations and error concealment operations will be performed.

An important technical advantage in the present invention inheres in the fact that the system 10 may utilize the CRC word as synchronization information if the synchronization word contained in the bit stream is invalid or if no synchronization information is explicitly contained in the data stream. As described previously, even if the first twelve bits of the new frame are not a synchronization word as determined in step 140 in FIG. 3b, the method will proceed and decode the frame if there is a CRC word present as determined in step 142 and that CRC word is determined to be valid in step 118. In this manner, the CRC information is used to conclude synchronization is present to prevent loss of synchronization due to single bit errors in the synchronization word. In addition, the CRC information can be used to determine synchronization if the syntax of the data stream does not include an explicit data field containing a synchronization word. The method of the present invention is capable of handling either situation alone or in combination.

Synchronization Recovery and Error Handling

Figure 3:
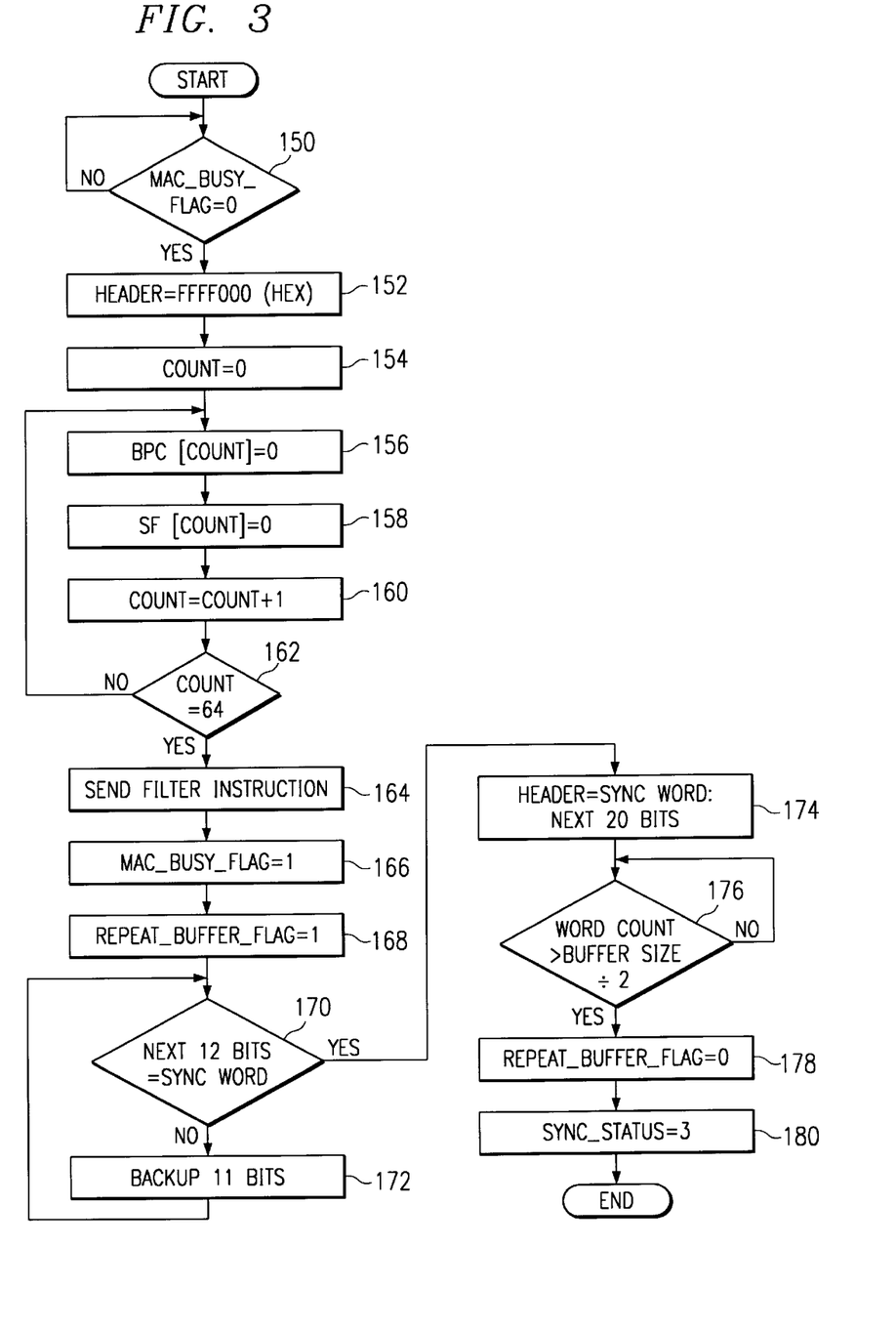

FIG. 3 is a flow chart representation of the synchronization recovery and error handling procedures used by system 10 to recover synchronization with the input data bit stream and to output muted audio data through output block 30. The method begins at step 150 where a MAC busy flag (MAC_BUSY_FLAG) is tested. The MAC busy flag indicates whether or not the multiplier accumulator 28 is busy. If the MAC busy flag is set equal to "1" indicating that the multiplier accumulator is busy, the method waits at step 150 until the MAC busy flag is set equal to "0" indicating that the multiplier accumulator 28 is unoccupied. The method then proceeds to step 152 where the header is set equal to FFFF000H to indicate a layer one header. The method then proceeds to step 154 where a count variable is set equal to "0". The count variable is used to properly address the bits per code word and scale factors used in the muting operation. The method proceeds to step 156 where the bits per code word for the current value of the count variable is set equal to "0". The bits per code word and scale factors are stored in random access memory 26 for operation by execution controller 22 and multiplier accumulator 28. The method then proceeds to step 158 where the scale factor information associated with the current value of the count variable is set equal to "0". The method then proceeds to step 160 where the count variable is incremented. The method then proceeds to step 162 where the count variable is compared to "64". If the count variable is less than "64", the method returns to step 156 where the next set of bits per code word and scale factors are also set equal to "0". Steps 156–162 have the effect of outputting 64 sets of bits per code word and scale factors associated with a single block of muted audio data. An important technical advantage of the present invention inheres in the fact that the system 10 is capable of muting data on a block-by-block basis. This allows the system of the present invention to provide twelve times the resolution in error concealment in systems that perform error concealment on a frame-by-frame basis.

Once the full block of audio data is stored in random access memory 26 as indicated by the count variable being equal to "64" in step 162, the method proceeds to step 164 where the FILTER instruction is sent from the control processor 12 to the execution controller 22. The FILTER instruction causes the execution controller to perform the dequantization, transformation and filtering operations on the audio data stored in random access memory 26 using the multiplier accumulator 28. These operations are fully described in the Audio Decoder Patents previously incorporated herein by reference.

The method then proceeds to step 166 where the MAC busy flag is set equal to "1" to indicate to the remainder of system 10 that the multiplier accumulator 28 is occupied. The method then proceeds to step 168 where the repeat buffer flag (REPEAT_BUFFER_FLAG) is set equal to "1". The REPEAT_BUFFER_FLAG is used to instruct the execution controller 22 to continue to output the same audio data associated with muted audio blocks until the REPEAT_BUFFER_FLAG is cleared. In this manner, in order to output a sequence of muted audio blocks, the setup of the muted audio data performed in the repeated execution of steps 156 through 162 discussed previously need only be performed once. The REPEAT_BUFFER_FLAG is then set and remains set until the control processor 12 locates a synchronization word or a valid CRC sequence in the data stream. In this manner, the processing capability of the control processor 12 is freed to search for synchronization with the bit stream and muted audio data is automatically output through output block 30 until the REPEAT_BUFFER_FLAG is cleared.

The method proceeds from step 168 to step 170 where the next twelve bits are checked to see if they contain a synchronization word. If the next twelve bits do not contain a synchronization word in step 170, the method proceeds to step 172 where the control processor 12 backs up eleven bits in the bit stream and returns and performs the same check again in step 170. If the next twelve bits do contain a synchronization word at any time in step 170, the method proceeds to step 174 where the header register in status register 32 is set equal to the synchronization word concatenated with the next twenty bits in the bit stream.

The method then proceeds to step 176 where a determination is made as to whether or not the word count is greater than half the size of input buffer 18. The word count is a variable which indicates the number of words stored in input buffer 18. Accordingly, the determination in step 176 is essentially a determination as to whether or not the input buffer is greater than half full. If the input buffer 18 is not over half full, the method will remain at step 176 until enough data is input from the input data stream into input buffer 18. This step is performed to insure that the input buffer 18 will never underflow. Once the input buffer 18 is over half full, the method proceeds from step 176 to step 178 where the REPEAT_BUFFER_FLAG is set equal to "0" instructing the execution controller 22 to stop outputting blocks of muted audio data. The method proceeds to step 180 where the synchronization status variable is set equal to "3" to indicate that the system 10 is synchronized with the input data stream.

Input/Output Rate Balance Calculations

Figure 4:
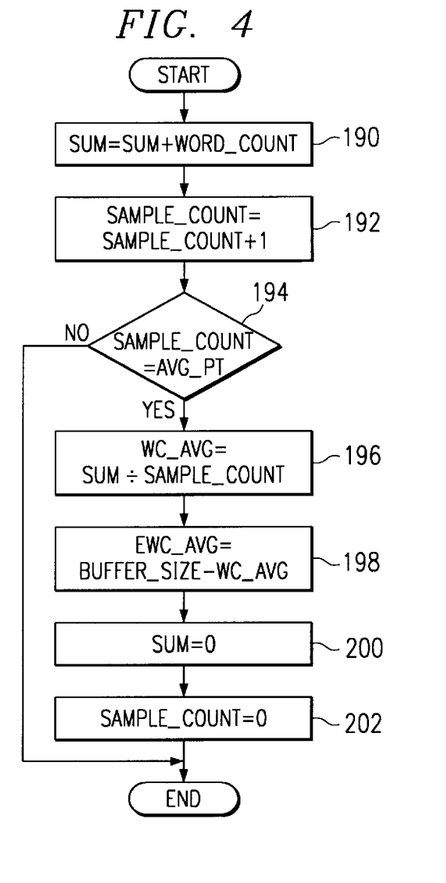

FIG. 4 is a flow chart representing the manner in which system 10 of the present invention implements the input/output rate balance calculations. These calculations are also described in the Rate Balance Patent previously incorporated herein by reference. The method begins at step 190 where a sum variable is set equal to the sum of the prior value for the sum variable and the word count variable. The sum is initialized at step 100 to be equal to "0". The word count variable is maintained so as to be equal to the number of words that are present in the input buffer 18. The method then proceeds to step 192 where a sample count variable is incremented. The sample count variable is also set equal to "0" in step 100 described previously. The sample count variable indicates the number of times the word count has been sampled. The method then proceeds to step 194 where a determination is made as to whether the sample count variable is set equal to the average point variable. The average point variable is a programmable value which sets the number of samples that are required before averaging takes place. If the average point has not been reached, the method concludes. If the average point is equal to the sample count number, the method proceeds from step 194 to step 196 where a word count average is calculated equal to the quotient of the sum divided by the sample count variable. The method then proceeds to step 198 where the average empty word count is calculated as the difference between the buffer size and the word count average. The buffer size is equal to the size of the input buffer 18. The method then proceeds to step 200 where the sum variable is once again set equal to "0". The method then proceeds to step 202 where the sample count variable is once again set equal to "0". The method then concludes.

As discussed previously, the information calculated in the method described in FIG. 4 may be output in a pulse width modulated format having a duty cycle proportional to the values of the word count average and empty word count average values calculated as described previously. Accordingly, the average fullness of the input buffer 18 can be communicated to systems associated with audio data processing system 10 to allow for adjustments in the rate at which input data is transmitted to system 10 and specifically input buffer 18. Accordingly, underflow or overflow of input buffer 18 and errors resulting from such underflow or overflow can be avoided by providing the feedback signals associated with the values calculated in the method described in FIG. 4.

Ancillary Pointer Check

Figure 5:
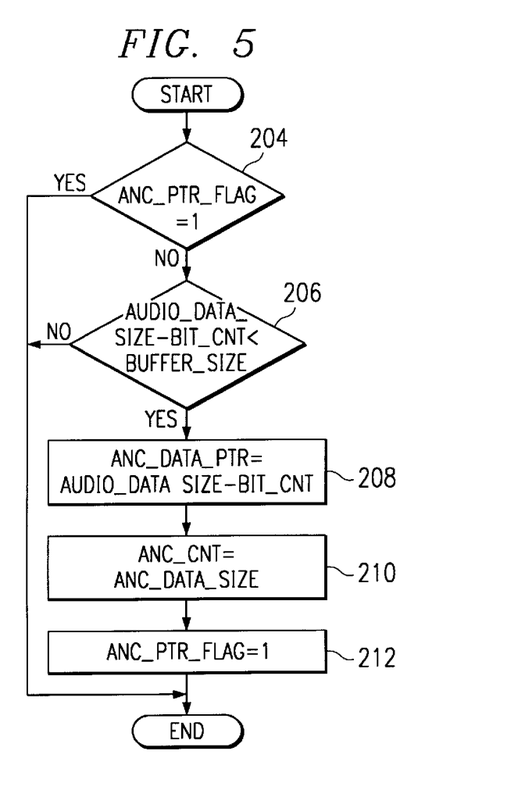

FIG. 5 is a flow chart representing the method used by system 10 to determine if the break point between ancillary data and audio data within a particular frame is resident in input buffer 18 at any particular time. As described previously, an ancillary pointer check operation is performed with each block of data to insure that no ancillary data is lost and that processing of audio data is not disrupted.

The method begins at step 204 where the ancillary pointer flag is checked. The ancillary pointer flag is set equal to "1" when the beginning of the ancillary data within the data stream is within the bounds of input buffer 18. If the ancillary pointer flag is already set equal to "1", the method concludes. If the ancillary flag is not equal to "1", the method proceeds to step 206 where a determination is made as to whether or not the difference between the audio data size and the bit count is less than the buffer size. The audio data size, as discussed previously, indicates the quantity of audio data within a particular frame and is determined from the header bit allocation and scale factor select information. The bit count variable indicates the number of bits already read within a particular frame. The difference between the audio data size and the bit count indicates the number of audio data bits which have not yet been read. If this amount is not less than the buffer size, the method concludes. If it is less than the buffer size, the break point between the audio data and the ancillary data within a particular frame is resident within the bounds of input buffer 18 and the method proceeds to step 208. At step 208, the ancillary data pointer is set equal to the difference between the audio data size and the bit count.

The ancillary data pointer serves as the tap point for the ancillary data handler 20 to remove ancillary data from the input FIFO buffer 18 and output the ancillary data. The method then proceeds to step 210 where the ancillary count variable is set equal to the ancillary data size calculated previously. The ancillary count variable is decremented by the ancillary data handler 20. When the ancillary count variable is set equal to "0", the ancillary data handler 20 will reset the ancillary pointer flag to "0" indicating to the remainder of the system 10 that the ancillary data within the current frame has been retrieved from input FIFO buffer 18 and output to systems associated with system 10. The method proceeds to step 212 where the ancillary pointer flag is set equal to "1". The method then concludes.

Accordingly, an audio data processing system is provided that allows for the efficient handling of ancillary data resident within frames of compressed audio data. The ancillary data is retrieved from an input buffer 18 and immediately output to prevent the loss of any ancillary data or the interference with the processing of audio data within the frame.

The system 10 of the present invention has been described with reference to the processes involved in decoding compressed audio data. However, it should be understood that the architecture of the present invention is equally applicable to a variety of other data processing operations. For example, by changing the microcoded operations controlling the control processor 12, the architecture of the present invention can be used to perform encoding and compression of audio data. Accordingly, although the present invention has been described in detail, it should be understood that various changes, substitutions and alterations may be made to the embodiments described herein without departing from the spirit and scope of the invention as solely defined by the appended claims.

What is claimed is:

1. A data processing system operable to process a data stream, comprising an input buffer operable to receive and store the input data stream; from said control processor while said control processor simultaneously processes a second portion of said audio data, said execution controller farther operable to determine a breakpoint between said portion of audio data and a portion of ancillary data and to load an ancillary pointer with a location in the in-put buffer corresponding to the break-point;

a multiplier accumulator coupled to said execution controller and operable to perform said processing of the data received from said control processor as directed by said execution controller; and an auxiliary handler coupled to said input buffer and operable to retrieve said ancillary data from said input buffer according to said ancillary pointer and to output said retrieved ancillary data.

2. The system of claim 1 wherein said processing comprises dequantization, transformation and filtering of the data stream in order to decode said audio data.

3. The system of claim 1 wherein said processing comprises quantization and transformation of the data stream in order to encode a data stream.

4. The system of claim 1 and further comprising an output buffer coupled to said control processor and operable to receive and store processed data from said control processor and to output said processed data as an output data stream simultaneously while said input buffer receives and stores said input data stream.

5. The system of claim 1 and further comprising a first microcode memory coupled to said control processor and operable to store sequences of instructions directing the operation of said control processor.

6. The system of claim 5 and further comprising a second microcode memory coupled to said execution controller and operable to store sequences of instructions directing the operation of said execution controller.

7. The system of claim 1 and further comprising a status register coupled to control processor and operable to store and output status information comprising information indicating the synchronization state of the system relative to the data stream, wherein said status register is accessible by an external system which is connected to said data processing system.

8. The data processing system of claim 1, wherein said ancillary handler is operable to retrieve said ancillary data simultaneously while said control processor processes said first portion of said audio data.

9. The data processing system of claim 8, wherein said ancillary handler is operable to retrieve said ancillary data in a manner that avoids accessing of said ancillary data by said control processor, whereby said control processor is not burdened with processing said ancillary data.

10. The data processing system of claim 9, further comprising a flag circuit connected to said ancillary handler and operable to inform said control processor that said ancillary data has been completely retrieved from said input buffer.

11. A data processing system operable to process a data stream comprising multiplexed audio and auxiliary data, the system comprising:

an input buffer operable to receive and store the input data stream;

a control processor circuit coupled to the input buffer and operable to retrieve audio data from the input buffer, said control processor further operable to process a first portion of said audio data;

an execution controller circuit coupled to said control processor and to direct dequantization, transformation, and filtering of the data received from said control processor while said control processor simultaneously processes a second portion of said audio data;

a multiplier accumulator circuit coupled to said execution controller and operable to perform said dequantization, transformation, and filtering of the data received from said control processor as directed by said execution controller;

an ancillary handler circuit coupled to said input buffer and operable to retrieve ancillary data from said input buffer and to output said retrieved ancillary data;

an output buffer coupled to said control processor and operable to receive and store processed data from said control processor;

first microcode memory coupled to said control processor and operable to store sequences of instructions directing the operation of said control processor;

second microcode memory coupled to said execution controller and operable to store sequences of instructions directing the operation of said execution controller; and a status register coupled to control processor and operable to store and output status information comprising information indicating the synchronization state of the system relative to the data stream.

\* \* \* \* \*

UNITED STATES PATENT AND TRADEMARK OFFICE
CERTIFICATE OF CORRECTION

PATENT NO. : 5,845,239
DATED : December 1, 1998
INVENTOR(S) : Frank L. Laczko, et. al.

Page 1 of 2

It is certified that error appears in the above-identified patent and that said Letters Patent is hereby corrected as shown below:

Claims 1 and 11 should read as follows:

1. A data processing system operable to process a data stream, comprising
 an input buffer operable to receive and store the input data stream;
 --a control processor coupled to the input buffer and operable to retrieve audio data from the input buffer, said control processor further operable to process a first portion of said audio data;
 an execution controller coupled to said control processor and operable to receive a subportion of said first portion of audio data from said control processor and to direct processing of the subportion of said first portion of audio data received-- from said control processor while said control processor simultaneously processes a second portion of said audio data, said execution controller further operable to determine a breakpoint between said portion of audio data and a portion of ancillary data and to load an ancillary pointer with a location in the input buffer corresponding to the breakpoint;
 a multiplier accumulator coupled to said execution controller and operable to perform said processing of the data received from said control processor as directed by said execution controller; and
 an auxiliary handler coupled to said input buffer and operable to retrieve said ancillary data from said input buffer according to said ancillary pointer and to output said retrieved ancillary data.

UNITED STATES PATENT AND TRADEMARK OFFICE
CERTIFICATE OF CORRECTION

Page 2 of 2

PATENT NO. : 5,845,239
DATED : December 1, 1998
INVENTOR(S) : Frank L. Laczko, et. al.

It is certified that error appears in the above-identified patent and that said Letters Patent is hereby corrected as shown below:

11. A data processing system operable to process a data stream comprising multiplexed audio and auxiliary data, the system comprising:
an input buffer operable to receive and store the input data stream;
a control processor circuit coupled to the input buffer and operable to retrieve audio data from the input buffer, said control processor further operable to process a first portion of said audio data;
an execution controller circuit coupled to said control processor and –operable to receive a subportion of said first portion of audio data from said control processor and– to direct dequantization, transformation, and filtering of the data received from said control processor while said control processor simultaneously processes a second portion of said audio data;
a multiplier accumulator circuit coupled to said execution controller and operable to perform said dequantization, transformation, and filtering of the data received from said control processor as directed by said execution controller;
an ancillary handler circuit coupled to said input buffer and operable to retrieve ancillary data from said input buffer and to output said retrieved ancillary data;
an output buffer coupled to said control processor and operable to receive and store processed data from said control processor;
first microcode memory coupled to said control processor and operable to store sequences of instructions directing the operation of said control processor;
second microcode memory coupled to said execution controller and operable to store sequences of instructions directing the operation of said execution controller; and
a status register coupled to control processor and operable to store and output status information comprising information indicating the synchronization state of the system relative to the data stream.

Signed and Sealed this

Second Day of May, 2000

Attest:

Attesting Officer

Q. TODD DICKINSON

Director of Patents and Trademarks